United States Patent
Christoph

(10) Patent No.: US 9,855,893 B2
(45) Date of Patent: Jan. 2, 2018

(54) GENERATING AN AUDIO SIGNAL WITH A CONFIGURABLE DISTANCE CUE

(71) Applicant: HARMAN BECKER AUTOMOTIVE SYSTEMS GMBH, Karlsbad (DE)

(72) Inventor: Markus Christoph, Straubing (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 15/100,096

(22) PCT Filed: Jul. 24, 2014

(86) PCT No.: PCT/EP2014/065907
§ 371 (c)(1),
(2) Date: May 27, 2016

(87) PCT Pub. No.: WO2015/078597
PCT Pub. Date: Jun. 4, 2015

(65) Prior Publication Data
US 2017/0001561 A1    Jan. 5, 2017

(30) Foreign Application Priority Data

Nov. 29, 2013 (EP) ................................. 13195117

(51) Int. Cl.
*B60Q 9/00* (2006.01)
*G08G 1/0962* (2006.01)
(Continued)

(52) U.S. Cl.
CPC ............. *B60Q 9/007* (2013.01); *B60Q 9/008* (2013.01); *G08G 1/0962* (2013.01); *G10K 15/12* (2013.01);
(Continued)

(58) Field of Classification Search
CPC ........ B60Q 9/007; B60Q 9/008; G10K 15/12; H04S 3/02; H04S 2400/11; H04S 2400/13; H04S 2420/07; G08G 1/168
See application file for complete search history.

(56) References Cited

U.S. PATENT DOCUMENTS 6,654,467 B1 * 11/2003 York ................... G10K 11/178
                                                                     381/71.14
2003/0007648 A1    1/2003 Currell
(Continued)

FOREIGN PATENT DOCUMENTS

| GB | 2255884 A | 11/1992 |
|---|---|---|
| GB | 2497627 A | 6/2013 |
| KR | 20080018409 A | 2/2008 |
| WO | 9120165 A1 | 12/1991 |

OTHER PUBLICATIONS

Written Opinion and International Search Report for corresponding Application No. PCT/EP2014/065907, dated Jan. 27, 2015, 10 pages.
(Continued)

*Primary Examiner* — Sonia Gay
(74) *Attorney, Agent, or Firm* — Brooks Kushman P.C.

(57) ABSTRACT

Generating an audio signal with a configurable distance cue includes the following: receiving an input audio signal that has at least one signal characteristic that contributes to a listener's auditory distance perception; receiving a distance control signal; and changing at least one characteristic in accordance with a distance control signal that is representative of the perceived distance.

19 Claims, 3 Drawing Sheets

(51) Int. Cl.
*G08G 1/16* (2006.01)
*H04S 3/02* (2006.01)
*G10K 15/12* (2006.01)

(52) U.S. Cl.
CPC ............ *H04S 3/02* (2013.01); *G08G 1/168* (2013.01); *H04S 2400/11* (2013.01); *H04S 2400/13* (2013.01); *H04S 2420/07* (2013.01)

(56) References Cited

U.S. PATENT DOCUMENTS

| | | | |
|---|---|---|---|
| 2006/0034463 A1* | 2/2006 | Tillotson | G08G 5/0095 381/1 |
| 2009/0226001 A1* | 9/2009 | Grigsby | G08G 1/0962 381/77 |
| 2010/0241438 A1 | 9/2010 | Oh et al. | |

OTHER PUBLICATIONS

Extended European Search Report for Application No. 13195117, dated Feb. 26, 2014, 6 pages.
European Office Action for Application No. 13195117, dated Mar. 5, 2016, 5 pages.
John M. Chowning, "Digital Sound Synthesis, Acoustics, and Perception: A Rich Intersection", Proceedings of the COST G-6 Conference on Digital Audio Effects (DAFX-00), Verona, Italy, Dec. 7-9, 2000, 6 pages.

* cited by examiner

GENERATING AN AUDIO SIGNAL WITH A CONFIGURABLE DISTANCE CUE

CROSS-REFERENCE TO RELATED APPLICATION

This application is the U.S. national phase of PCT Application No. PCT/EP2014/065907 filed on Jul. 24, 2014, which claims priority to EP Application No. 13195117.0 filed on Nov. 29, 2013, the disclosures of which are incorporated in their entirety by reference herein.

TECHNICAL FIELD

The disclosure relates to a system and method for generating an audio signal with a configurable distance cue.

BACKGROUND

The perception of distance is distinct from intelligibility. Sounds perceived as further away can be perfectly intelligible, but can be easily ignored. This circumstance is particularly important for all kinds of alarm tones and announcement signals that vitally require adequate attention. This is particularly true for announcement signals such as parking sensors and navigation signals in vehicles. Parking sensors are proximity sensors for road vehicles designed to alert the driver to obstacles while parking. These systems, which use either electromagnetic or ultrasonic sensors, are variously marketed by vehicle manufacturers under proprietary brand names such as Park Distance Control (PDC), Park Assist or Parktronic. In some applications, it is desirable to change the perceived distance of alarm signals.

SUMMARY

A system for generating an audio signal with a configurable distance cue comprises a signal characteristic modification module that is configured to receive an input audio signal with at least one signal characteristic. The at least one signal characteristic contributes to a listener's auditory distance perception. The signal characteristic modification module is further configured to change at least one characteristic in accordance with a distance control signal that is representative of the perceived distance.

In a computer readable storage medium with stored software code that a processor can execute to perform a method for generating an audio signal with a configurable distance cue, the method comprises the following: receiving an input audio signal that has at least one signal characteristic that contributes to a listener's auditory distance perception; receiving a distance control signal; and changing at least one characteristic in accordance with a distance control signal that is representative of the perceived distance.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following description and drawings. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
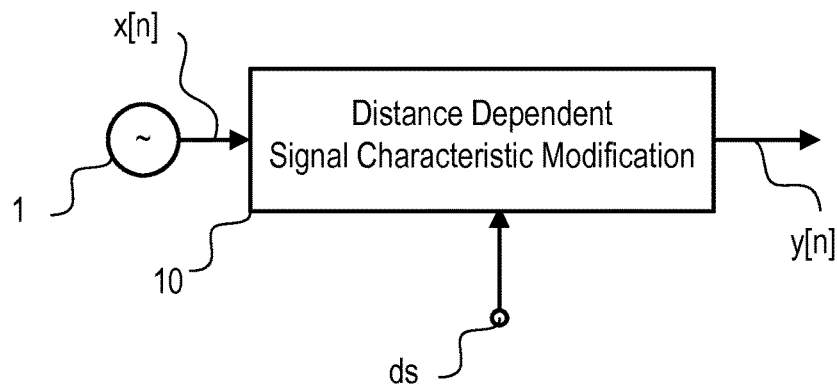
FIG. 1 is a schematic diagram of an exemplary system for generating an audio signal with a configurable distance cue.

The human auditory system offers some mechanisms to determine the distance of a sound source. At close range, there are indications for distance determination such as extreme level differences (e.g., when whispering into one ear) or specific pinna resonances. The auditory system uses these cues to estimate the distance to a sound source:

(1) Direct-to-reverberant ratio (DRR): In enclosed rooms, two types of sound arrive at a listener: Direct sound arrives at the listener's ears without being reflected from a reflective surface such as a wall. Reflected sound is reflected from a reflective surface at least one time before arriving at the listener. The ratio between direct sound and reflected sound can give an indication about the distance of the sound source. The more reflective the sound, the further away it seems.

(2) Loudness: Distant sound sources have a lower loudness than close ones. This aspect can be evaluated especially for well-known sound sources.

(3) Sound spectrum: High frequencies are more quickly damped by the air than low frequencies due to the higher energy content of low frequencies and the frequency-dependent absorption coefficient of typical damping material. A distant sound source therefore sounds more muffled than a close one because the high frequencies are attenuated. For sound with a known spectrum (e.g., speech), the distance can be roughly estimated with the help of the perceived spectrum of the sound.

(4) Initial time delay gap (ITDG): ITDG describes the time difference between the arrivals of the direct wave and the first strong reflection at the listener. Nearby sources cause a long ITDG. If the source is far away, time differences hardly arise.

(5) Movement: Similar to the visual system, there is also a phenomenon of motion parallax in acoustical perception (Doppler effect). For a moving listener, nearby sound sources pass faster than distant sound sources.

(6) Level difference: Very close sound sources cause a different level between the ears.

There are two mechanisms by which sonic distance can be perceived from medial sound energy based on the physical effects of reverberation on signals that have a perceived pitch. One of these mechanisms involves the ability to perceive the amplitude fluctuations that occur due to interference when the source signal and the reverberation are not in steady state. The other mechanism involves the effect of reverberation on the phase coherence of overtones in the speech formant range. This perception has an additional use—the perception of distance. Phase coherence allows for the perception of the direct-to-reverberant ratio of many common sounds and for the objective measurement of the direct-to-reverberant ratio by way of a model.

Humans can perceive the apparent distance of a sound source with surprising accuracy, even when the stimulus is presented equally in both ears. This ability is particularly robust for signals that have the properties of speech— namely a syllabic stream of sounds with a perceivable pitch. Because humans can easily detect distance, distance perception is important to the overall perception of sound quality. Humans prefer certain sounds at certain perceived distances, so the amount of direct sound at the listening position becomes quite important.

In order to improve the perceptibility of alarm or information tones, or to provide a spatial impression of relative movements, the perceived distance of a sound signal may be changed. Parking sensor or navigation signals mainly consist of harmonics. The phase correlation of its harmonics may be modified in such a way that a desired perceived distance cue will result. The aforementioned principles, such as the principal of pitch-coherence, may be involved, particularly in connection with access to the raw data or the signal source. As described below, the phase coherence of the harmonics may be changed in a desired way. The desired grade of phase correlation, i.e., the desired distance cue, can thereby be chosen automatically, for example, by the distance to the next turning point for a navigation system or by the measured distance to an obstacle for a park sensor system. Furthermore, the (acoustic) quality of announcement systems may be enhanced by introducing the possibility to modify the distance cue in a predictable and controllable way. The principle of pitch-coherence may be employed for manipulating the distance cue of a listener, which may be achieved by modification of the phase coherence of a signal's harmonics without changing either the direct-to-reverberation ratio or the sound pressure level (SPL) of the signal. However, other principles or a combination of principles may be employed as well.

Referring to FIG. 1, a system for generating an audio signal with a configurable distance cue may comprise input audio signal source 1, which provides input audio signal x[n]. Input audio signal x[n] may be a park sensor signal or a navigation signal and may have at least one signal characteristic that contributes to a listener's acoustic distance perception. Input audio signal x[n] may be supplied to signal characteristic modification module 10, which provides a modified audio signal, i.e., output signal y[n]. Signal characteristic modification module 10 may change at least one audio signal characteristic such as spectral composition, amplitude, phase coherence, reverberation, delay, etc. in accordance with distance control signal ds, which is representative of the perceived distance. The at least one signal characteristic affects at least one of the following: harmonic phase coherence, direct/reverberant ratio, loudness, sound spectrum, initial time delay gap, movement and level difference.

Figure 2:
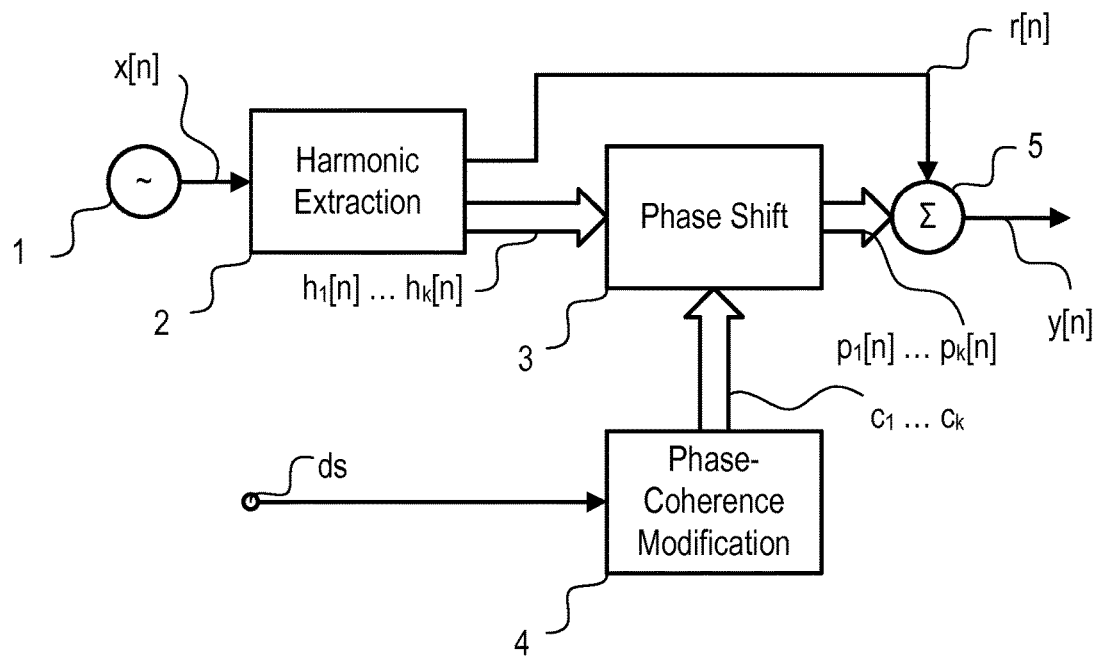
FIG. 2 is a schematic diagram of an exemplary system for generating an audio signal with a configurable distance cue using phase coherence.

Another system for generating an audio signal with a configurable distance cue, as shown in FIG. 2, may comprise input audio signal source 1, which provides input audio signal x[n]. Input audio signal x[n] may be a park sensor signal or a navigation signal that comprises a multiplicity of harmonics. A harmonic is a component frequency of a signal that is an integer multiple of the fundamental frequency; i.e., if the fundamental frequency is f, the harmonics have frequencies of 2 f, 3 f, 4 f, etc. The harmonics are all periodic at the fundamental frequency, therefore the sum of harmonics is also periodic at the fundamental frequency. Harmonic frequencies are equally spaced by the width of the fundamental frequency and can be found by repeatedly adding that frequency. Harmonic extraction module 2 extracts the k harmonics of input audio signal x[n] and provides signals $h_1[n] \ldots h_k[n]$, representative of the k harmonics of input audio signal x[n]. Each of the signals $h_1[n] \ldots h_k[n]$ have a respective frequency and phase. Harmonic extraction module 2 may include any spectral analyzing hardware and/or software such as a fast Fourier transformation (FFT) processing module, a filter bank module, a comb filter module, or an adaptive filter module.

Controllable phase shifting module 3 is connected downstream of harmonic extraction module 2 and changes the phases of signals $h_1[n] \ldots h_k[n]$ in accordance with distance control signal ds. Distance control signal ds is representative of the sonic distance of a sound source as perceived by a listener at a listening location. Distance control signal ds may be generated, for example, by a navigation system (e.g., a head unit with navigation), a parking distance measuring and control system or any other appropriate system or device (not shown in the figures).

Phase coherence modification module 4 receives and processes distance control signal ds to provide k phase control signals $c_1 \ldots c_k$ for phase shifting module 3. Phase control signals $c_1 \ldots c_k$ control the phases of signals $h_l[n] \ldots h_k[n]$. Summer 5 sums up all (phase shifted) signals $h_l[n] \ldots h_k[n]$ or signals $p_1[n] \ldots p_k[n]$ phase shifting module 3, to provide output audio signal y[n]. Summer 5 may also add residual signal r[n], which may be provided by harmonic extraction module 2 and which represents all non-harmonic parts of input audio signal x[n].

Figure 3:
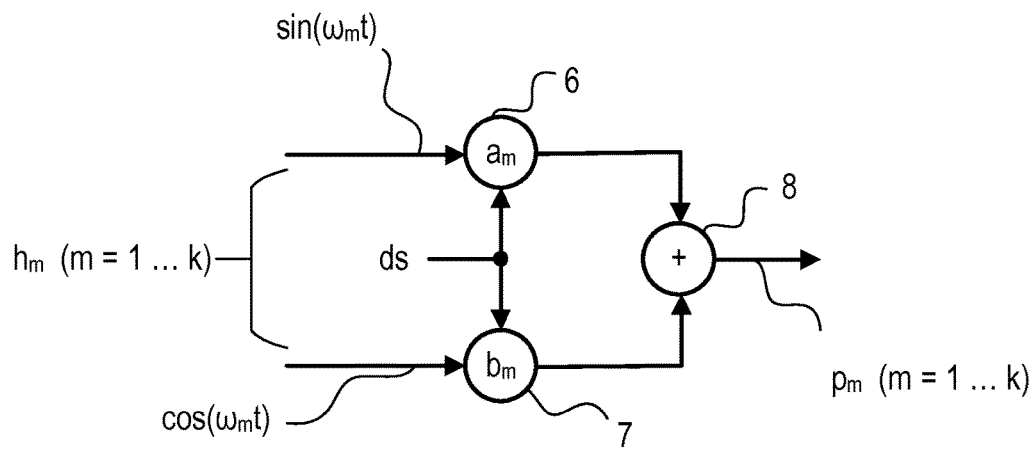
FIG. 3 is a schematic diagram of an element of a phase shifting module applicable in the system shown in FIG. 2.

Referring to FIG. 3, it is assumed that signals $h_1[n] \ldots h_k[n]$ are provided as orthogonal signals, i.e., each of the signals $h_1[n] \ldots h_k[n]$ is provided as two signals $\sin(\omega_m t)$ and $\cos(\omega_m t)$ with identical amplitude and frequency, but with a phase difference of 90°, wherein m identifies the $m^{th}$ orthogonal harmonic with $m=1 \ldots k$. Phase coherence modification module 4 may include two coefficient elements 6 and 7 (with coefficients $a_m$ and $b_m$) per harmonic that multiply the two orthogonal signals $\sin(\omega_m t)$ and $\cos(\omega_m t)$ by coefficients $a_m$ and $b_m$, respectively. Signals $a_m \cdot \sin(\omega_m t)$ and $b_m \cdot \cos(\omega_m t)$, resulting from these multiplications, are added in adder 8 to provide a signal representing the $m^{th}$ phase shifted (modified) harmonic $h_m$, i.e., signal $p_m$, with $m=1 \ldots k$. The coefficients $a_m$ and $b_m$ may be such that $a_m+b_m=1$ if the amplification of phase shifting module 3 is intended to be one. The two orthogonal signals $\sin(\omega_m t)$ and $\cos(\omega_m t)$ may be generated from a single signal $h_m$, e.g., by way of a 90° phase shifter, a Hilbert transformer or the like. Coefficients $a_m$ and $b_m$ may be controlled (changed) by way of distance control signal ds such that at any time $a_m+b_m=$constant.

Figure 4:
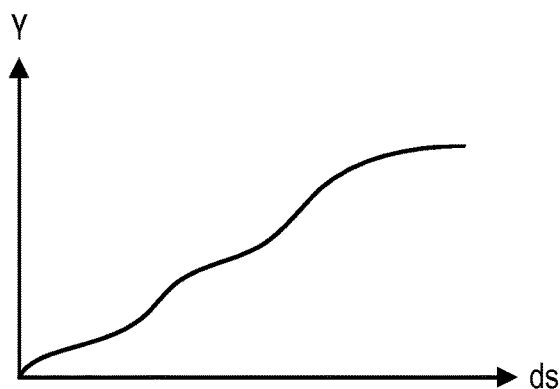
FIG. 4 is a diagram illustrating an exemplary phase distance characteristic.

FIG. 4 shows the behavior of phase shift y over distance (phase distance characteristic) for one harmonic or a multiplicity of harmonics, as represented by distance control signal ds for a specific harmonic. As can be seen, the phase deviation is smaller the smaller the perceived distance is. Phase coherence modification module 4 may employ a calculation model, function, algorithm or table to define the phase distance characteristics for each harmonic. The model or the table may be derived from actual measurements or calculations.

Figure 5:
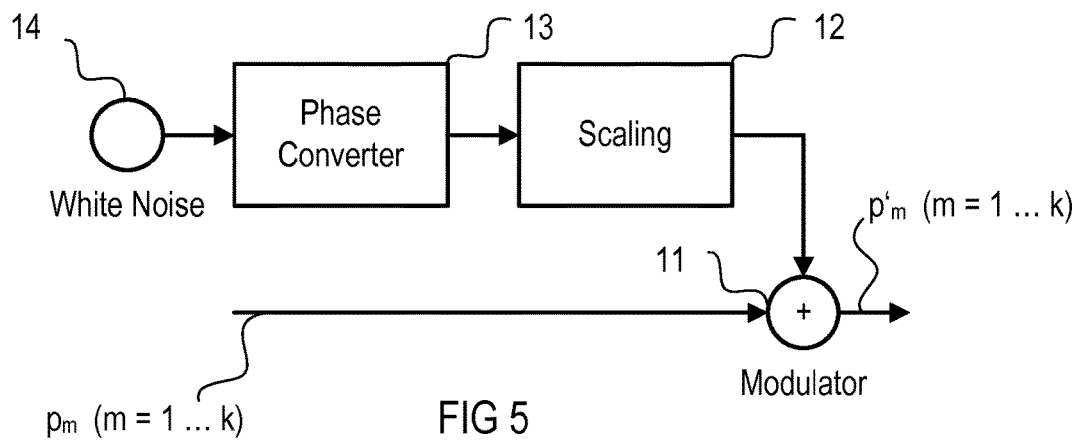
FIG. 5 is a schematic diagram of a phase coherence modification module.

Referring to FIG. 5, another exemplary way to shift the phases of harmonics $h_m$ may be for the phase coherence modification module to control the phase shifting module to provide randomly or pseudo-randomly phase modulated signals representative of the harmonics. The phase shifting module may be or may (also) include phase modulator 11, which phase modulates signal $p_m$ (supplied, for example, by the phase shifting module shown in FIG. 3 or alternatively by signal $h_m$) to provide a randomly phase shifted harmonic $p'_m$. The resulting harmonic phase shift may vary within the exemplary range between −10° and +10° around primary phase shift $p_m$, which is provided by the phase shifting module shown in FIG. 3. The range is set by scaling module 12, which provides the modulation signal from an output signal of phase conversion module 13, which is connected downstream of white noise generator 14. White noise generator 14 generates a white noise signal, i.e., a signal with randomly or pseudo-randomly varying amplitude. Phase conversion module 13 converts the white noise signal into a phase control signal that allows for phase control in a phase range between −180° and +180°. This range is scaled down, e.g., to −10° to +10° or any other appropriate range, by scaling module 12. Modulation may be performed by multiplication or addition of signal $p_m$ and the output signal of scaling module 12. Alternatively, the module shown in FIG. 5 may be used instead of the phase shifting module shown in FIG. 3 if scaling module 12 is controllable by the distance control signal and can provide asymmetrical ranges, for example, −5° to +15° or +10° to +30°.

Figure 6:
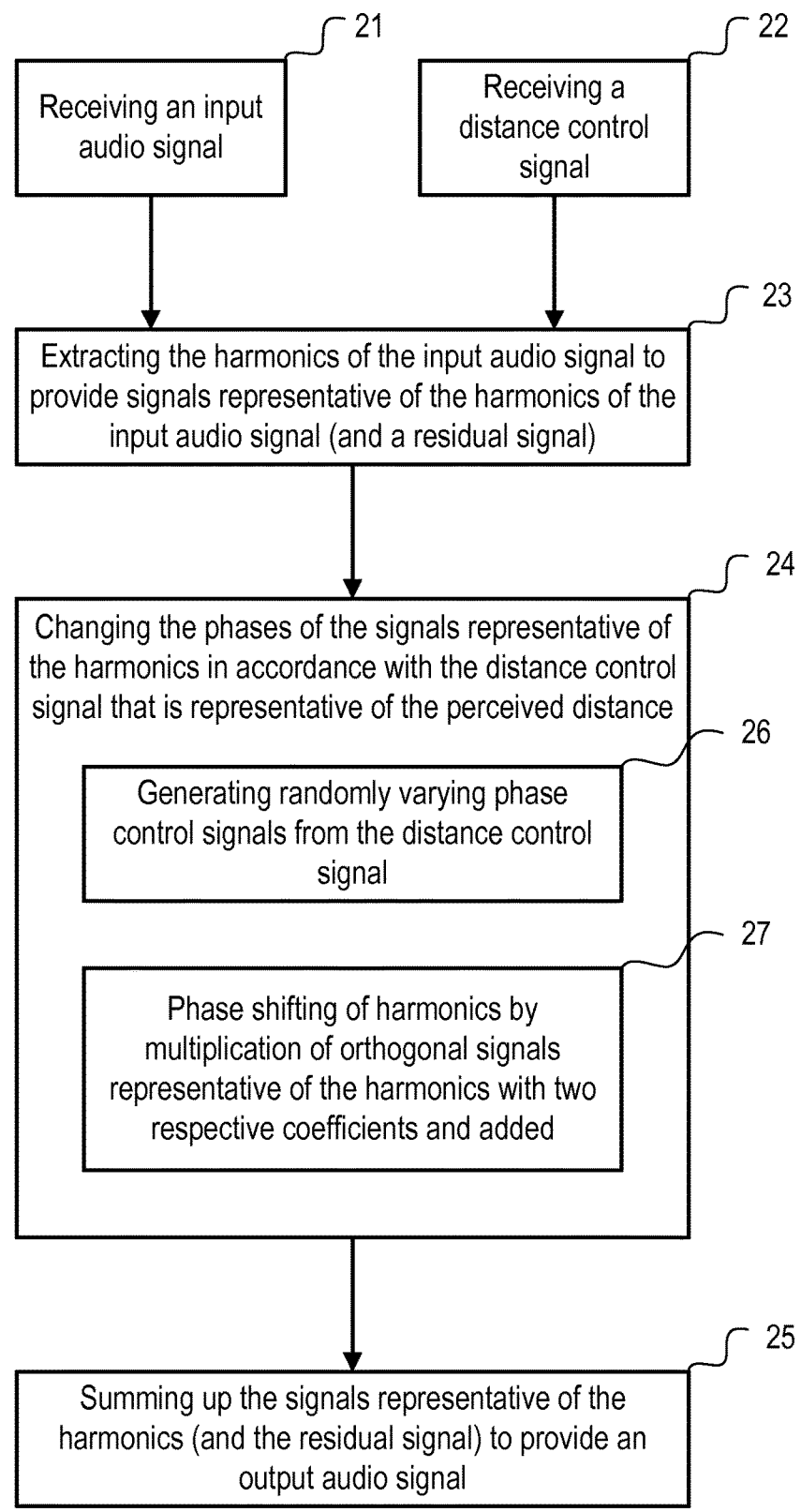
FIG. 6 is a flow chart of a method for generating an audio signal with a configurable distance cue.

FIG. 6 shows the flow chart of a method for generating an audio signal with a configurable distance cue. The method may be implemented by way of software code that is executable by a processor and that is stored on a computer readable storage medium. For example, the method may comprise the following steps:

a) Receiving the input audio signal that comprises a multiplicity of harmonics (21).
b) Receiving a distance control signal (22).
c) Extracting the input audio signal's harmonics to provide signals representative of the input audio signal's harmonics (23). Each of the signals is representative of the harmonics that have respective frequencies and phases.
d) Changing the phases of the signals representative of the harmonics (phase coherence modification) in accordance with a distance control signal that is representative of the perceived distance (24). The phase coherence modification module may be such that randomly or pseudo-randomly phase modulated signals represent the harmonics. The phase modulation may be within a given phase band, i.e., a range within the phase of a harmonic or multiple harmonics may vary for a given state of the distance control signal.
e) Summing up the signals representative of the harmonics to provide an output audio signal (25) and an optional residual signal that includes non-harmonic signal parts of the input audio signal.

The step of changing the phases may comprise generating phase control signals from the distance control signal (26). Each phase control signal controls the phase of one of the signals representative of the harmonics of the input audio signal such that the phase of the respective harmonic in the output audio signal corresponds to a distance cue set by the distance control signal.

Furthermore, the signals representative of the harmonics may be orthogonal signals. The phase of one harmonic may be shifted by multiplying the orthogonal signals representative of the harmonics by two respective coefficients and adding the results of the two products (27). The phase shift is controllable by changing the coefficients of the coefficient elements. The sum of the two coefficients of a coefficient element may be constant, e.g., equal to one.

The perceived distance of a sound source in a reflective or partially reflective space can be quantified in part by humans' ability to extract fundamental pitch frequencies from overtones in the frequency range of the vocal formants. The ease with which this can be done depends on the direct-to-reverberant ratio and the initial time delay gap. When the direct-to-reverberant ratio above 1000 Hz drops below about 2 dB, a sound is perceived as distant. Sounds perceived as close to a listener demand his/her attention. Sounds perceived as far away can be ignored. Humans perceive distance almost instantly on hearing a sound of any loudness, even if they hear it monaurally (with only one ear)—or in a single audio channel. It has been found that a major cue for distance is the phase coherence of upper harmonics of pitched sounds. Experiments have discovered that the ability to localize sound in the presence of reverberation increases dramatically at frequencies above 700 Hz. Thus, localization in a room is almost exclusively perceived through harmonics of tones, not through their fundamental frequencies.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A non-transitory computer readable storage medium with stored software code that a processor can execute to generate an audio signal with a configurable distance cue, the computer readable storage comprising instructions to:
   receive an input audio signal that has at least one signal characteristic, the at least one characteristic contributing to a listener's auditory distance perception; and
   change the at least one characteristic in accordance to a distance control signal that is representative of a perceived distance,
   where the input audio signal comprises a multiplicity of harmonics and further comprising instructions to:
   receive the input audio signal; extract the harmonics of the input audio signal to provide signals representative of the harmonics of the input audio signal, each of the signals being representative of the harmonics having respective frequencies and phases;
   change the phases of the signals representative of the harmonics in accordance with the distance control signal; and
   sum up the signals representative of the harmonics to provide an output audio signal,
   where the at least one signal characteristic affects a phase coherence of harmonics.

2. The computer readable storage medium of claim 1, where the at least one signal characteristic further affects at least one of a direct/reverberant ratio, loudness, sound spectrum, initial time delay gap, movement and level difference.

3. The computer readable storage medium of claim 2, further comprising instructions to receive the distance control signal and to provide phase control signals for changing the phases of the signals representative of the harmonics,
   wherein the phase control signal controls the phase of one of the signals representative of the harmonics of the input audio signal such that the phase of the respective harmonic in the output audio signal corresponds to a distance cue set by the distance control signal.

4. The computer readable storage medium of claim 3, further comprising instructions to employ a calculation model, function, algorithm or table to define phase distance characteristics for each harmonic.

5. The computer readable storage medium of claim 3, further comprising instructions to control a phase shifting module to provide randomly or pseudo-randomly phase modulated signals representative of the harmonics.

6. The computer readable storage medium of claim 2 further comprising instructions to:
shift the phase of one harmonic with phase shift elements;
wherein each phase shift element comprises two coefficient elements for multiplication by a respective coefficient and an adder connected downstream of the coefficient elements;
wherein the signals representative of the harmonics are orthogonal signals and are supplied to the coefficient elements;
wherein the phase shift element is controllable by changing coefficients of the coefficient elements; and
wherein a sum of the two coefficients elements of a coefficient element is constant.

7. The computer readable storage medium of claim 2, further comprising instructions to sum up the signals representative of the harmonics and a residual signal that includes non-harmonic signal parts of the input audio signal.

8. The computer readable storage medium of claim 1, where the audio signal is a warning signal, a distance signal or a navigation signal.

9. A non-transitory computer readable storage medium with stored software code that a processor can execute to perform a method for generating an audio signal with a configurable distance cue, the method comprising:
receiving an input audio signal that has at least one signal characteristic that contributes to a listener's auditory distance perception;
receiving a distance control signal; and
changing at least one characteristic in accordance with the distance control signal that is representative of a perceived distance, where the input audio signal comprises a multiplicity of harmonics and the method further comprises:
extracting the harmonics of the input audio signal to provide signals representative of the harmonics of the input audio signal, each of the signals being representative of the harmonics having respective frequencies and phases;
changing the phases of the signals representative of the harmonics in accordance with a distance control signal that is representative of the perceived distance; and
summing up the signals representative of the harmonics to provide an output audio signal,
where the at least one signal characteristic affects a phase coherence of harmonics.

10. The computer readable storage medium of claim 9, where the at least one signal characteristic further affects at least one of a direct/reverberant ratio, loudness, sound spectrum, initial time delay gap, movement and level difference.

11. The computer readable storage medium of claim 9, where the method further comprises generating phase control signals from the distance control signal; each phase control signal controls the phase of one of the signals representative of the harmonics of the input audio signal such that the phase of the respective harmonic in the output audio signal corresponds to a distance cue set by the distance control signal.

12. The computer readable storage medium of claim 10, where the phase control signals are configured to provide randomly or pseudo-randomly phase modulated signals representative of the harmonics.

13. The computer readable storage medium of claim 10, the method further comprises summing up the signals representative of the harmonics and a residual signal that includes non-harmonic signal parts of the input audio signal.

14. A non-transitory computer readable storage medium with stored software code that a processor can execute to generate an audio signal with a configurable distance cue, the computer readable storage comprising instructions to:
receive an input audio signal that has at least one signal characteristic, the at least one signal characteristic contributing to a listener's auditory distance perception; and
change at least one characteristic in accordance with a distance control signal that is representative of a sonic distance as perceived by a listener at a listening location,
where the input audio signal comprises a multiplicity of harmonics and further comprising instructions to:
receive the input audio signal; extract the harmonics of the input audio signal to provide signals representative of the harmonics of the input audio signal, each of the signals being representative of the harmonics having respective frequencies and phases;
change the phases of the signals representative of the harmonics in accordance with the distance control signal; and
sum up the signals representative of the harmonics to provide an output audio signal,
where the at least one signal characteristic affects a phase coherence of harmonics.

15. The computer readable storage medium of claim 14, where the at least one signal characteristic affects at least one of a direct/reverberant ratio, loudness, sound spectrum, initial time delay gap, movement and level difference.

16. The computer readable storage medium of claim 14, further comprising instructions to:
receive the distance control signal; and
provide phase control signals for changing the phases of the signals representative of the harmonics, each phase control signal controls the phase of one of the signals representative of the harmonics of the input audio signal such that the phase of the respective harmonic in the output audio signal corresponds to a distance cue set by the distance control signal.

17. The computer readable storage medium of claim 16, further comprising instructions to employ a calculation model, function, algorithm or table to define phase distance characteristics for each harmonic.

18. The computer readable storage medium of claim 10 where the method further comprises:
shifting the phase of one harmonic with phase shift elements;
wherein each phase shift element comprises two coefficient elements for multiplication by a respective coefficient and an adder connected downstream of the coefficient elements;
wherein the signals representative of the harmonics are orthogonal signals and are supplied to the coefficient elements;
wherein the phase shift element is controllable by changing coefficients of the coefficient elements; and
wherein a sum of the two coefficients elements of a coefficient element is constant.

19. The computer readable storage medium of claim 15 further comprising instructions to:
- shift the phase of one harmonic with phase shift elements;
- wherein each phase shift element comprises two coefficient elements for multiplication by a respective coefficient and an adder connected downstream of the coefficient elements;
- wherein the signals representative of the harmonics are orthogonal signals and are supplied to the coefficient elements;
- wherein the phase shift element is controllable by changing coefficients of the coefficient elements; and
- wherein a sum of the two coefficients elements of a coefficient element is constant.

* * * * *